United States Patent
Rayburn et al.

(10) Patent No.: US 8,060,108 B1
(45) Date of Patent: Nov. 15, 2011

(54) METHOD AND APPARATUS FOR GENERATING AND OUTPUTTING A LOCATION DATA STREAM

(75) Inventors: Terry G. Rayburn, Kansas City, MO (US); Michael P. McMullen, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 887 days.

(21) Appl. No.: 11/737,485

(22) Filed: Apr. 19, 2007

(51) Int. Cl.
*H04W 24/00* (2009.01)

(52) U.S. Cl. ............... 455/456.1; 455/456.2; 455/456.3; 455/456.6; 455/457; 455/41.3; 342/356; 342/357.01; 342/357.03; 342/357.06; 342/357.09

(58) Field of Classification Search .............. 455/427, 455/404.2, 41.2, 41.3, 443, 456.1–456.6, 455/556.1, 557, 432.1, 3.06; 342/356, 357.01, 342/357.03, 357.06, 357.07, 357.08, 357.09, 342/357.1, 357.12, 357.13, 357.17
See application file for complete search history.

(56) References Cited

U.S. PATENT DOCUMENTS

| | | | | |
|---|---|---|---|---|
| 5,043,736 | A * | 8/1991 | Darnell et al. | 342/357.1 |
| 5,594,425 | A * | 1/1997 | Ladner et al. | 340/539.18 |
| 6,075,458 | A * | 6/2000 | Ladner et al. | 340/825.49 |
| 6,700,533 | B1 * | 3/2004 | Werb et al. | 342/357.07 |
| 7,138,943 | B2 * | 11/2006 | Sheynblat | 342/357.09 |
| 7,304,606 | B2 * | 12/2007 | Pande et al. | 342/357.09 |
| 7,433,712 | B2 * | 10/2008 | Moran et al. | 455/557 |
| 7,495,608 | B1 * | 2/2009 | Chen et al. | 342/357.09 |
| 7,574,215 | B1 * | 8/2009 | Fan et al. | 455/456.1 |
| 2002/0077126 | A1 | 6/2002 | Pihl et al. | |
| 2002/0080063 | A1 | 6/2002 | Bloebaum et al. | |
| 2002/0168985 | A1 | 11/2002 | Zhao et al. | |
| 2003/0078054 | A1 * | 4/2003 | Okuda | 455/456 |
| 2004/0002814 | A1 | 1/2004 | Gogic | |
| 2004/0072576 | A1 * | 4/2004 | Nuutinen et al. | 455/456.1 |
| 2004/0147269 | A1 * | 7/2004 | Kim | 455/456.2 |
| 2004/0156326 | A1 | 8/2004 | Chithambaram | |
| 2004/0203915 | A1 | 10/2004 | van Diggelen et al. | |
| 2005/0140544 | A1 | 6/2005 | Hamel et al. | |
| 2005/0186967 | A1 * | 8/2005 | Ozluturk | 455/456.1 |
| 2005/0208953 | A1 | 9/2005 | Lee | |
| 2006/0082499 | A1 | 4/2006 | Pitt et al. | |
| 2007/0205875 | A1 * | 9/2007 | De Haan | 340/425.5 |

* cited by examiner

*Primary Examiner* — Olumide T Ajibade Akonai (57) ABSTRACT

A method and apparatus for providing a sequence of location data points to a mapping device. A cellular mobile station uses GPS satellite signals to compute its varying location over time and outputs the location as data points in a sequence to the mapping device. If the mobile station loses satellite communication, it transitions the output sequence to a static state in which the location data points are a substantial repetition of the last location that the mobile station determined from satellite signals. Further, when the mobile station detects that it has entered into a new cellular coverage area, it obtains satellite assistance data from its cellular carrier network and uses the data to renew satellite communication. The mobile station may then transition the sequence back to a dynamic state, with location data points determined over time based on received satellite signals.

26 Claims, 3 Drawing Sheets

METHOD AND APPARATUS FOR GENERATING AND OUTPUTTING A LOCATION DATA STREAM

FIELD OF THE INVENTION

The present invention relates to location tracking and, more particularly, to facilitating presentation of active location maps or other use of location data.

BACKGROUND

With the open availability of the Global Positioning System (GPS) and other satellite-based positioning systems, personal location tracking devices have gained widespread acceptance and popularity in recent years. By receiving and analyzing satellite signals, such devices can quickly compute their location using well known positioning algorithms and can present the computed location as it changes over time, superimposed on a street map for convenient viewing by a user. Consequently, such a device enables a person to see where they are located as they move from place to place.

Increasingly, vehicles are equipped with built-in navigation units, for instance. Such units enable a driver to readily track where the vehicle is located. Further, provided with mapping data and a destination location entered by the driver, such units can provide the driver with real-time turn-by-turn directions to reach the destination. Portable navigation units with similar functionality are also widely available and can be conveniently mounted in a vehicle or carried by a person to facilitate location tracking and navigation. Unfortunately, however, these navigation units tend to be fairly expensive, thus preventing more widespread market penetration.

Due to government regulations that require cellular wireless carriers to enable determination of cell phone location for emergency response (E-911), virtually all cell phones manufactured and sold today also happen to include a GPS receiver. When a cell phone user calls 911 or another emergency number, the cell phone's location can thus be determined with a fairly high degree of accuracy and reported to a public safety answering point, to facilitate emergency response.

In practice, the cell phone receives from its serving wireless carrier a set of satellite-assistance-data that provides the cell phone with parameters regarding satellites covering the cell phone's current cellular wireless coverage area. The cell phone then uses the assistance-data to tune to various satellites and to receive satellite signals. In turn, the cell phone may use those signals to compute its own location, or the cell phone may send those signals to a location-determination system in the wireless carrier's network, and that system may use the signals to compute the cell phone's location. In either case, the computed location may then be reported to the public safety answering point handing the cell phone's emergency call.

Further, the same technology can be employed to facilitate a myriad of commercial location-based services for cell phone users. For instance, a cell phone user may engage in a wireless-web session with a location-based service provider to learn the location of a store or other establishment nearest to the user's current location, without the need for the user to enter the current location in the form of a street address for instance. The cell phone or network may simply determine the cell phone's location and report that location to the location-based service provider, and the location-based service provider may then use the reported location to look up nearby stores or other establishments. As with the navigation units described above, such technology can also be used to provide cell phone users with travel routing and other useful navigation services.

SUMMARY

Advantageously, the small cost of having GPS receivers in cell phones is folded into the cost of owning and operating cell phones and is thus largely transparent to the average user. Yet the fact that cell phones are now required to include GPS receivers provides a convenient and very low cost way to facilitate generation of useful navigation data. In particular, if a cell phone is connected locally with a rudimentary mapping device, the cell phone can be made to generate and feed a sequence of location data points over time to the mapping device, so that the mapping device can present a user over time with an indication of the user's changing location, superimposed on a street map of the like.

More generally, any cellular communication device that includes a UPS receiver can be used for this purpose. For example, a cellular wireless data card in the form of a PCMCIA card that fits in the slot of a notebook computer could have a GPS receiver that functions to receive satellite signals, and the card could use the satellite signals to determine its location over time and could output a sequence of location data points over time to the host processor of the computer. A mapping program running on the computer can then conveniently present the changing location over time superimposed on a street map for viewing by a user.

Just as well, a handheld cell phone could have a UPS receiver that functions to receive satellite signals, and the handset could use the satellite signals to determine its location over time and could generate a sequence of data points over time. As the cell phone generates the sequence of data points, it may then transmit the sequence over a local wireless connection (e.g., BLUETOOTH) or wireline connection (e.g., USB) to a computer or other mapping device. And the computer or other mapping device can present the changing location over time superimposed on a street map for viewing by a user.

In practice, the cellular wireless device can provide the sequence of location data points to the mapping device in any of a variety of forms, the details of which are not critical. In one arrangement, for instance, the cellular wireless device could provide the sequence in a form compliant with the National Maritime Equipment Association (NMEA) standards for reporting a location fix, such as an "NMEA GGA Quality 1" (GPS) location fix stream. The recipient mapping device would then be arranged commensurately to receive and process the sequence, so as to be able to present the location sequence on a map or the like.

Although a cellular wireless device offers a low cost and simple mechanism to provide a UPS location sequence to a mapping device, a problem can arise if the cellular wireless device loses communication with the GPS satellites. For instance, if the cellular wireless device is positioned indoors or otherwise lacks a clear enough view of the sky, the cellular wireless device may be unable to receive the satellite signals necessary to enable a computation of the device's location. Consequently, if a user is relying on the cellular wireless device to provide location data to a mapping device, an error may result if the cellular wireless device loses or is unable initially to establish satellite communication.

One solution to this problem of losing satellite communication is for the cellular wireless device to instead obtain a read of its location through communication with its serving cellular radio access network. For instance, the cellular wireless device could send regular queries via the cellular radio access network to a location-determination system, seeking a read on the device's location. In each instance, the location-determination system may then invoke a process to determine the device's location, such as by advanced forward link tri-lateration based on positions of cellular base station towers for instance, and the location-determination system may report each determined location point to the cellular wireless device.

With this mechanism, the cellular wireless device can in theory continue to provide a location sequence to the mapping device, even if the cellular wireless device loses satellite communication. Furthermore, this mechanism enables the cellular wireless device to begin its location sequence with wireless carrier provided location data, in the event the cellular wireless device lacks satellite communication to start. Thus, for instance, if the cellular wireless device is indoors and lacks satellite communication at the time a user directs it to begin sending a location sequence to the mapping device, the cellular wireless device can begin the process of obtaining a sequence of location data points from the wireless carrier and can provide that sequence to the mapping device. Once the cellular wireless device moves into an area where it has satellite communication, it can then transition to generating its location sequence based on GPS satellite data.

Unfortunately, however, this solution itself gives rise to yet another problem. Namely, location-determination signaling between a cellular wireless device and a wireless carrier's location-determination system, as well as the associated processing and signaling that may occur in the carrier's network, can greatly burden the network. For instance, such signaling may consume valuable air interface resources and backhaul resources that the radio access network could be using to serve other devices. Thus, the solution is not optimal.

To help avoid this problem of burdening the wireless carrier's network and infrastructure, the cellular wireless device can instead be made to output a constant, unchanging location sequence for the time that it lacks satellite communication. In turn, when the cellular wireless device recovers satellite communication, it can then transition to outputting a satellite-based location sequence.

For instance, if the cellular wireless device has been outputting a location sequence that it has generated based on received satellite signals, and the device loses satellite communication, the device may then continue to output the location sequence but with each location data point being substantially identical (within reason) to the last one that it computed. As a result, the location sequence that the mapping device receives from the cellular wireless device will indicate that the cellular wireless device is stationary, since the location will remain substantially unchanged. This is a sensible result, since there is a fairly good chance that, if the cellular wireless device is actually moving, it will soon be in a position where it can regain satellite communication.

Furthermore, this process should work well if the cellular wireless device begins generation of the location sequence when indoors and lacking satellite communication. Conveniently, in that scenario, the device may obtain a single location-fix from the wireless carrier's location-determination system and may then repetitively output that very location data point in its location sequence to the mapping device. That way, the mapping device can sensibly present a fairly static location, which may allow a user of the device to plan routes or the like. Once the cellular wireless device moves outside and obtains a clear enough view of the sky, it may then begin obtaining satellite signals and computing its location based on the satellite signals, and thus it may transition its output location sequence to dynamically vary as its location changes.

Still further, when the cellular wireless device is in a mode where it is outputting a substantially unchanging location sequence, the cellular wireless device can use its cellular wireless serving system as a trigger for the device to recover satellite communication. In particular, the cellular wireless device may detect that it has transitioned from being served by a first cellular wireless coverage area (e.g., a first cell or sector) to a second cellular wireless coverage area (e.g., a second cell or sector), which would reflect the fact that the cellular wireless device has moved and might benefit from seeking to recover satellite communication. Similarly, the device may detect that its cellular received signal strength has reached a threshold level, which could similarly indicate that the device has moved and might benefit from seeking to recover satellite communication.

When such a cellular network trigger occurs, the cellular wireless device may then obtain assistance-data from its serving network and may use the assistance-data to attempt satellite communication. If the cellular wireless device is thereby capable of receiving the necessary satellite signals, it may then begin receiving those signals, computing its location, and outputting as its location sequence to the mapping device its potentially-changing location over time.

These as well as other aspects, advantages and alternatives will become apparent to those of ordinary skill in the art by reading the following detail, with reference where appropriate to the accompanying drawings.

DETAILED DESCRIPTION

Referring to the drawings, as noted above, FIG. 1 is a simplified block diagram of a system in which an exemplary embodiment of the invention can be implemented. It should be understood, however, that these and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Figure 1:
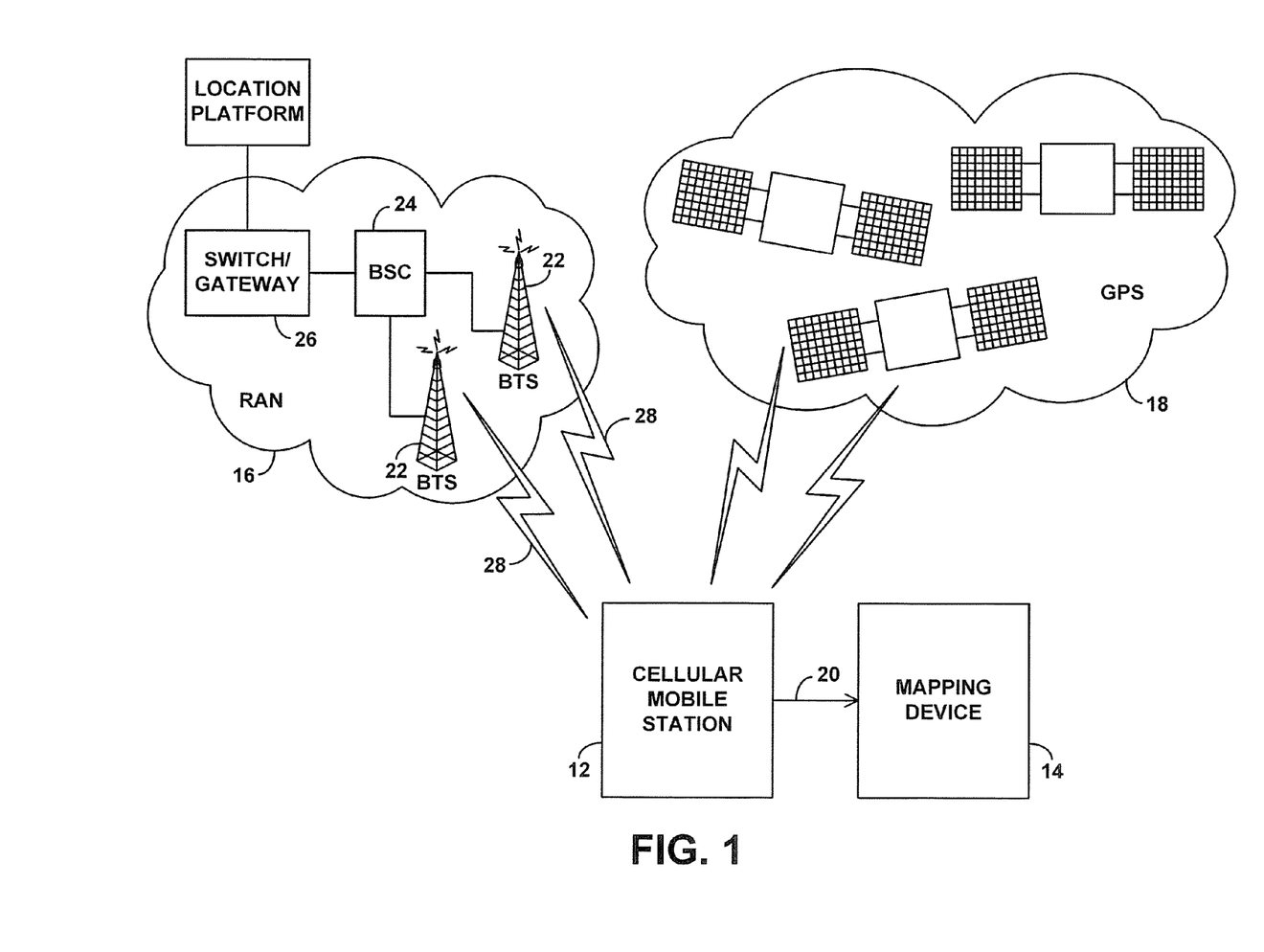
FIG. 1 is a simplified block diagram of a system in which an exemplary embodiment of the invention can be implemented.

As shown in FIG. 1, the exemplary system includes a cellular mobile station 12, a mapping device 14, a cellular radio access network (RAN) 16, and a satellite-based global positioning system 18. As a general matter, mobile station 12 is equipped to communicate wirelessly with the cellular RAN 16 and with the global positioning system 18 in order to obtain location data necessary to facilitate generation of a location output stream. Mobile station 12 is then equipped to communicate via a link 20 with mapping device 14 in order to provide the mapping device 14 with a sequence of location data points indicating the location of mobile station 12 over time. In turn, mapping device 14 is equipped to receive the sequence of location data points and to present a user with a map that actively depicts the location data points over time, as a navigation mechanism.

Mobile station 12 preferably comprises a portable cellular communication device, such as a cell phone, personal digital assistant (PDA), or PC card, that can be conveniently carried by a person. (Alternatively, the mobile station could be mounted or integrated in a vehicle, as an in-dash cell phone, or could be provided in some other manner.) As such, the mobile station 12 preferably provides a user with wireless communication service, allowing the user to engage in telephone and/or data communications via RAN 16 for instance. By way of example, if the mobile station is a cell phone, the mobile station would conventionally allow the user to place and receive telephone calls wirelessly via RAN 16. And as another example, if the mobile station is a PC card, the mobile station would allow the user's computer to engage in wireless packet data communication via RAN 16. Mobile station 12 may take other forms as well.

RAN 16 provides mobile station 12 with cellular communication service, allowing the mobile station to access various network resources through an air interface connection. RAN 16 can take a variety of forms, depending on the particular communication protocols and equipment used. Accordingly, the details of RAN 16 are not critical.

In an example arrangement, RAN 16 may include multiple base transceiver stations (BTSs) 22 (sometimes referred to as "base stations", "access points", or by other names), each of which includes one or more antennas and circuitry that enables the BTS to communicate wirelessly with served mobile stations such as mobile station 12. Each BTS generally defines a cell or cell site. Further, each BTS may include directional antennas and circuitry that subdivides its cell into multiple sectors, with communication in each sector being uniquely defined by one or more communication parameters, such as frequencies, timeslots, or modulation codes, for instance. As additionally shown, one or more BTSs in a RAN may then be coupled with a base station controller (BSC), and one or more BSCs in a RAN may be coupled with a switch or gateway 26 such as a mobile switching center (MSC) or packet data serving node (PDSN) that provides connectivity with other network elements beyond the RAN.

In each cell or cell sector, RAN 16 communicates over an air interface 28 with served mobile stations, according to an agreed air interface communication protocol. Examples of such protocols include, without limitation, CDMA (e.g., 1xRTT or 1xEV-DO), TDMA, FDMA, AMPS, GSM, GPRS, UMTS, WiMAX, BLUETOOTH, and Wi-Fi (e.g., 802.11 protocols). Preferably, the RAN and air interface protocol support wide-range wireless communication, as is typical with most cellular communication systems, such as the systems provided by Sprint Nextel Corporation and other wireless carriers. However, the RAN and air interface protocol may instead or in addition support short-range wireless communication, such as where one or more base stations or cell sectors are provided to serve a small area such as a home or office, for instance.

In general operation, RAN 16 may broadcast control channel messages respectively in of its cells or cell sectors (or other cellular wireless coverage areas), to provide served mobile stations with information about the cellular service. For instance, the control channel messages may specify various communication parameters that a mobile station should use when communicating with the RAN in the wireless coverage area. Further, the control channel messages may include a pilot signal that enables a mobile station to determine signal strength per coverage area and to facilitate handoff from area to area as the mobile station moves or as conditions change.

Typically, at least one of the control channel messages broadcast on a per wireless-coverage-area basis will expressly or inherently identify the wireless coverage area. For instance, the control channel message may expressly specific a sector identifier that distinguishes the wireless coverage areas from adjacent wireless coverage areas. As another example, the control channel message may be transmitted using unique parameters, such as being modulated with a unique code (e.g., PN-offset or the like) or frequency, and the fact that a mobile station would use those unique parameters (e.g., de-modulating with the particular PN-offset or frequency) to receive the signal would inherently identify the coverage area or at least distinguish it from adjacent coverage areas.

Consequently, as a mobile station moves throughout the service are provided by one or more RANs, the mobile station may detect a transition from the mobile station being served by a given wireless coverage area (e.g., a particular sector) to the mobile station being served by another wireless coverage area (e.g., another sector). In practice, the mobile station may engage in idle or active handoff from one coverage area to another, such as when the mobile station detects that the pilot signal strength of a new coverage area is sufficiently high compared with the pilot signal strength of one or more other coverage areas currently serving the mobile station.

The manner in which this transition between wireless coverage areas occurs may vary from protocol to protocol. Under CDMA, for instance, a mobile station typically maintains in data storage a record of an "active set" of sectors with which the mobile station communicates with, i.e., currently serving the mobile station. When the mobile station detects that the pilot signal strength of another sector is sufficiently higher than the lowest pilot signal strength of the sectors in the mobile station's active set, the mobile station may then signal to the RAN to request permission to handoff. Alternatively, the mobile station may autonomously invoke the handoff. Further, in other systems, a mobile station may apply other processes to detect its transition from being served by one coverage area to being served by another coverage area, taking into account various factors, such as signal strength, location, control channel messages, or the like.

In the exemplary embodiment, mobile station 12 further includes hardware, software, and/or firmware components that facilitate determination of the mobile station's location. Preferably, these components include a GPS chipset suitable for communicating with global positioning system 18, as well as logic for communicating with RAN 16 and for processing various signals to determine or facilitate determination of location.

As is well known in the art, and as discussed briefly above, the location of the mobile station can be determined in various ways, with or without the use of information from the global positioning system 18. By way of example, the location of a mobile station can be determined by having the mobile station measure the time delay of its communication with various satellites and then performing a basic geometric analysis to determine the mobile station's location taking into account the known orbit/positions of the satellites. In practice a location platform 30 operated by the mobile station's wireless service provider may provide the mobile station 12 with satellite-assistance data that enables the mobile station to tune to particular satellites in order to make these measurements. The mobile station may then perform the geometric analysis and determine its own location, or the mobile station may transmit its measurements to the location platform 30 and the location platform may perform the geometric analysis, determine the location, and report the location to the mobile station.

As another example, the location of the mobile station can be determined without use of the global positioning system, by analyzing the mobile station's communication with cellular base stations at known positions. In particular, the mobile station may measure the time delay of its communication with various base stations 22, and a basic geometric analysis taking into account the known positions of those base stations can be used to determine the location of the mobile station. As with the GPS-based process, this analysis could be conducted by the mobile station itself, or the mobile station could provide its measurements to the location platform 30 and the location platform may conduct the analysis and report the location to the mobile station.

Industry standards, such as IS-41, IS-801 and IS-881 define various well known messages that can pass between a mobile station and a RAN and between a RAN and a location platform such as a mobile positioning center or position determining equipment for instance, to facilitate these or other location determination functions. As these processes are well known in the art, they are not described further in this document.

In the exemplary embodiment, mobile station 12 further includes hardware, software, and/or firmware logic arranged to generate and output a sequence of location data points indicating a location of the mobile station over time. As noted above, this sequence can take various forms but is preferably compliant with the well known NMEA standards for reporting a location fix. Most preferably, the sequence would comprise an NMEA GGA Quality 1 location fix stream, assuming mapping device 14 is commensurately equipped to receive and process such a stream. The sequence could take other forms as well.

The mobile station 12 may include program logic with which a user can interact in order to direct the mobile station 12 to begin generating the location sequence. For instance, the program logic may define a user interface providing a menu or soft-key that a user can engage in order to start the sequence generation. In response, the mobile station would then begin generating the sequence. In basic practice, the mobile station may use any of the mechanisms noted above, or any other mechanism, to determine data points of the location sequence. For instance, the mobile station may measure its time delay of communication with various satellites and/or base stations and may perform geometric analysis to determine its location or may request location platform 30 to perform the analysis and return an indication of its location. As the mobile station establishes data points of the location sequence, the mobile station outputs the location sequence via link 20 to the mapping device 14.

As noted above, mapping device 14 operates to receive a sequence of location data points from mobile station 12 and to use the location sequence to present an active location-map to a user. Mapping device 14 may take various forms. By way of example and without limitation, mapping device 14 may be a general purpose personal computer or dedicated navigation unit that is programmed with logic executable by a processor to receive the sequence and, for each location data point in the sequence, to display on a map a graphical indication of where the location data point is, in relation to other map points such as roads, mountains, bodies of water, commercial points of interest, and the like. Preferably, mapping device 14 is as portable as mobile station 12. For instance, mapping device may comprise a notebook or pocket computer or a handheld navigation unit.

The connection 20 between mobile station 12 and mapping device 14 may take various forms, whether wired, wireless, direct, and/or networked. By way of example, and without limitation, the connection may comprise a BLUETOOTH, Wi-Fi, infrared, USB, UWB, FIREWIRE, or card-insertion type connection, and the connection may extend over a network such as a personal area network or other type of network. As a specific example, the mobile station and mapping device may each include a BLUETOOTH transceiver and may communicate with each other via BLUETOOTH communication. As another specific example, the mobile station and mapping device may each include a USB port and may be coupled together by a USB cable. As yet another example, the mobile station and mapping device may each include a WFi transceiver and communicate with each other via a Wi-Fi router (e.g., on a boat or in some other vehicle). And as still another example, the mobile station may insert into a card-slot (or the like) of the mapping device, such as by connection to a PCMCIA card slot of a notebook computer for instance. Other examples are possible as well.

As discussed above, an exemplary embodiment of the invention may thus take the form a method that can be carried out by mobile station 12. According to the method, the mobile station may generate a sequence of location data points (e.g., an NMEA GGA sequence) that indicates location of the mobile station over time, and the mobile station may transmit the sequence to a mapping device (e.g., personal computer or other mapping device) for use by the mapping device to generate and present an active location-map to a user.

The sequence of location data points generated by the mobile station preferably has both a "dynamic state" and a "static state", and thus the sequence-output by the mobile station has a "dynamic state" and a "static state." In the "dynamic state," the data points of the sequence vary over time as the mobile station receives varying information from satellites and uses the information (itself or by querying/interaction with a location platform) to generate the location data points. In the "static state," the data points of the sequence are substantially unchanging over time.

Figure 2:
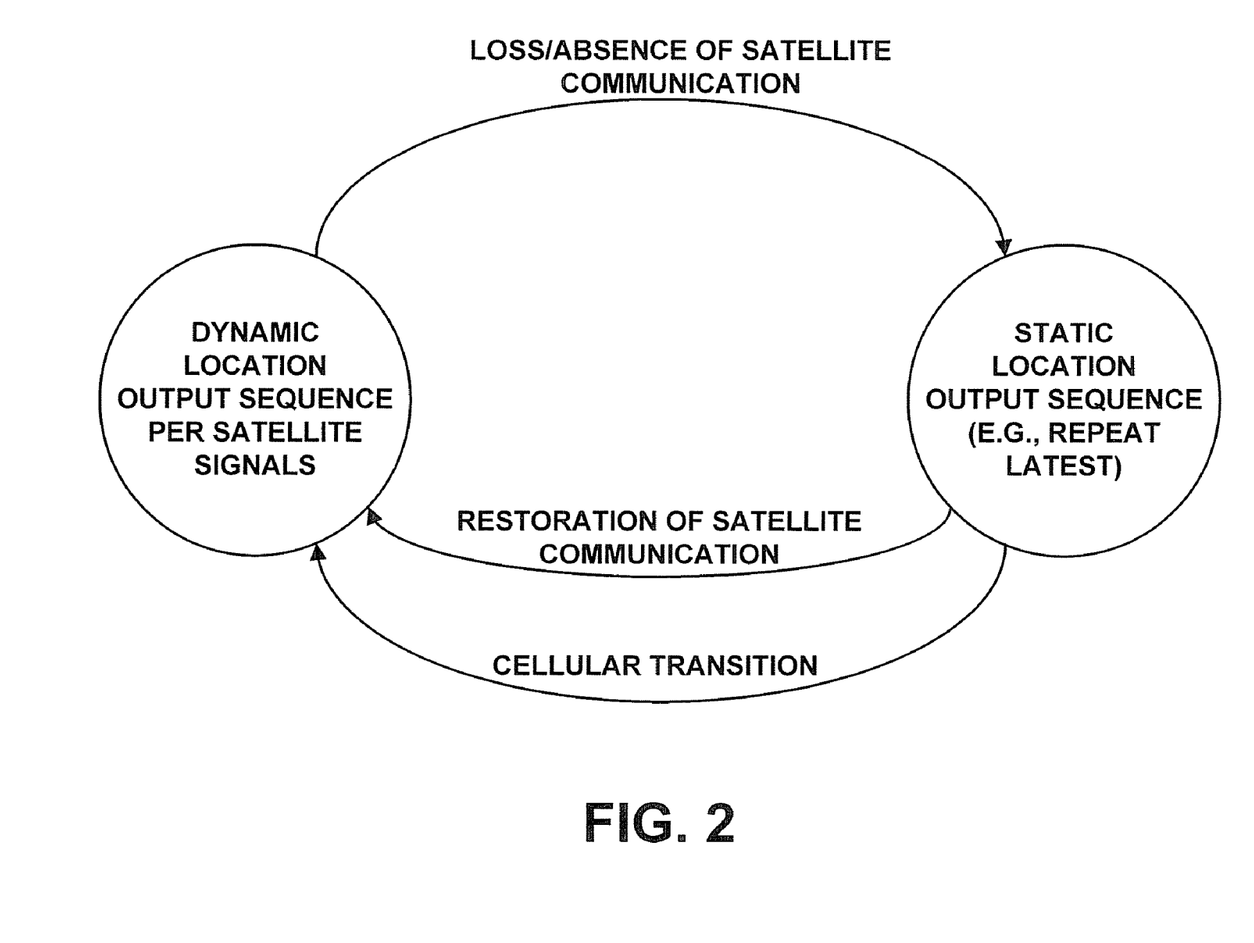
FIG. 2 is a state diagram depicting states of a location output sequence in accordance with the exemplary embodiment.

FIG. 2 is a state diagram depicting these two states and the manner in which the mobile station transitions between the states. The left circle in FIG. 2 represents the dynamic state of the location sequence, and the right circle in FIG. 2 represents the static state of the location sequence.

In accordance with the method, the mobile station may begin the process in the dynamic state. In particular, the method may begin with the mobile station determining its varying location based on GPS satellite information. This assumes that the mobile station is capable of receiving satellite signals and thus that the mobile station has a clear enough view of the sky or is connected with one or more antennas that have a clear enough view of the sky.

In this state, the mobile station will have determined its location at least once, but preferably periodically, by analyzing its satellite communication and/or by querying or otherwise interacting with a location platform or other entity that analyzes the mobile station's satellite communication. Accordingly, the mobile station 12 will have output to the mapping device 14 at least one indication of the mobile station's location determined based on an analysis of the mobile station's communication with one or more GPS satellites. As the mobile station moves, this GPS-determined location would change, and thus the data points of the location sequence that the mobile station outputs to the mapping device would vary.

In accordance with the method, the mobile station will transition the location output sequence from the dynamic state to the static state when the mobile station detects loss of satellite communication, as illustrated by the right-pointing arrow in FIG. 2. The mobile station may programmatically conclude that it has detected loss of satellite communication whenever the mobile station fails to receive satellite signals from at least one of the satellites from which it would normally receive a signal for use in determining its location. Alternatively, the mobile station may programmatically conclude that it has detected loss of satellite communication whenever the mobile station fails to receive satellite signals from a sufficient number of satellites necessary to facilitate determination of its location. Other bases for concluding that the mobile station has lost satellite communication are possible as well.

In practice, while the mobile station may be outputting varying location data points determined based on satellite information, the mobile station may thus transition to continue outputting location data points, but with the points being substantially unchanging over time, i.e., with the output being in the static state. For example, the mobile station may transition the sequence to have location data points be a substantially constant repetition of a location data point that the mobile station generated when the sequence was in the dynamic state, such as with each data point of the sequence being a copy of the last one that the mobile station determined in the dynamic state. It should be understood that minor changes in the location data points are possible within reason while still remaining within the static state.

In this way, the sequence in the static state received by the mapping device would indicate substantially no change in position of the mobile station over time, rather than indicating no location (or an error). Thus, the mapping device may be unaware that the location sequence has changed from the dynamic state to the dynamic state, since the location sequence may appear to be a normal, continuous sequence, albeit with location data points substantially unchanging. Based on the location sequence, the mapping device would therefore present to the user a map showing no movement over time.

Furthermore, while the mobile station is outputting the sequence in the static state, the mobile station will preferably transition back to the dynamic state in response to detecting that the mobile station has transitioned in cellular network service, as shown by one of the left-pointing arrows in FIG. 2. In the exemplary embodiment, the mobile station may detect that it has transitioned in cellular network service by detecting that it has entered and remained in a new wireless coverage area (e.g., cell or sector) for a threshold period of time or by detecting a threshold cellular received signal strength in a new coverage area. Alternatively, the mobile station may detect that it has transitioned in cellular network service by detecting that it has transitioned from being served by a first cellular coverage area to being served by a second cellular coverage area, in any of the ways described above or in some other way now known or later developed.

When the mobile station is outputting the sequence in the static state and the mobile station detects that it has transitioned in cellular network service, the mobile station will preferably request and obtain new satellite assistance-data, such as by communicating via RAN 16 with location platform 30. In turn, the mobile station will then use the obtained assistance-data to engage in satellite communication, such as by attempting to tune to receive signals from the indicated satellites, thus completing the transition to the dynamic state. Assuming the mobile station successfully receives satellite signals, the mobile station may thus continue to output the location sequence but now with data points determined dynamically based on the satellite communication.

Furthermore, when the mobile station is outputting the sequence in the static state and the mobile station detects restoration of satellite communication, the mobile station may responsively transition the output sequence from the dynamic state to the static state, as shown by the other left-pointing arrow in FIG. 2. In practice, the mobile station may thus check for satellite communication in response to detecting a transition in cellular service as discussed above or in response to some other trigger, such as periodically for instance. If the mobile station successfully regains satellite communication, such as if the mobile station moves to a place where it has a clear enough view of the sky, the mobile station may then automatically transition the output sequence to the dynamic state.

Advantageously, the mapping device may be unaware that the output sequence transitions from the static state to the dynamic state. The sequence may be continuous, but the location data points in the sequence may then begin varying as the mobile station moves and it location determined based on satellite communication changes.

In the exemplary embodiment, the mobile station may alternatively start its transmission of the location data point sequence in the static state, before the mobile station transmits the sequence in the dynamic state. This may occur when the mobile station starts the process when indoors or when otherwise lacking sufficient satellite communication to generate the sequence in the dynamic state. Thus, the mobile station may programmatically begin in the static state if it does not have satellite communication at the start. If the mobile station then goes outside or otherwise regains satellite communication, or if the mobile station detects a cellular service transition, it may then continue satellite continue to output the location sequence but may transition the sequence to the dynamic state.

When beginning the location sequence in the static state, the mobile station may transmit the sequence with the location data points of the sequence being a substantially constant repetition of an initial location data point that the mobile station determines without the help of the satellite system. For instance, the mobile station may transmit the sequence with the location data points being a substantially constant repetition of an initial location data point that the mobile station determines by requesting the mobile station's location from RAN 16, location platform 30, or some other cellular network based location-determination system.

In particular, the mobile station may begin the location sequence in the static state by sending a location-determination request via RAN 16 to location platform 30, preferably providing location platform 30 with measurements of time delay of the mobile station's communication with various serving BTSs. Location platform 30 may then determine the mobile station's location by applying a basic geometric analysis (e.g., advanced forward link trilateration) and may then return the determined location to the mobile station. Alternatively, provided with sufficient information about base station location itself, the mobile station may itself perform this analysis to establish its initial location data point.

The mobile station may then output the sequence of location data points with each data point being a repetition of that determined initial location data point, without the need to continuously query the network for further location fixes.

Figure 3:
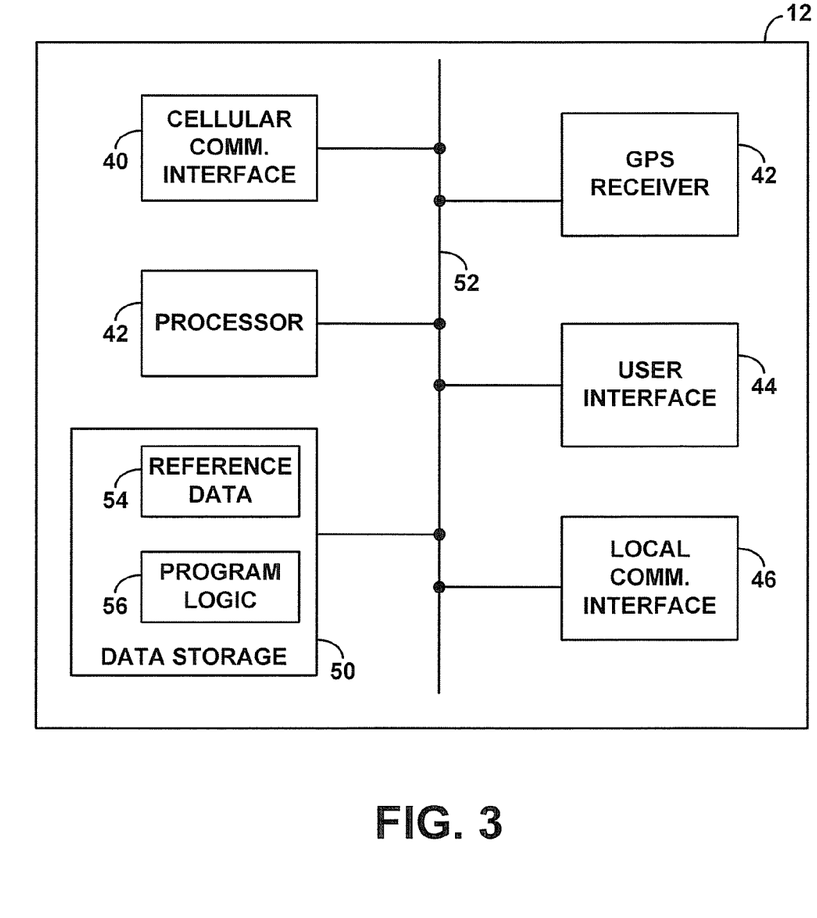
FIG. 3 is a simplified block diagram of a mobile station arranged to implement the exemplary embodiment.

In a further respect, the exemplary embodiment may take the form of a cellular mobile station, such as mobile station 12. FIG. 3 is a simplified block diagram depicting components of such as mobile station. As shown in the figure, the exemplary mobile station 12 includes, within a mobile station housing, a cellular wireless transceiver 40, a GPS receiver 42, a user interface 44, a local connection interface 46, a processor 48, and data storage 50, all of which may be communicatively linked together by a system bus, network, or other mechanism 52.

Cellular wireless transceiver 40, together with one or more antennas (not shown), operates to communicate with RAN 16, to facilitate various cellular communication services such as those noted above. Example cellular wireless transceivers include the "MSM" chipsets manufactured by Qualcomm Incorporated, but others can be used as well. The configuration and functionality of the cellular wireless transceiver may depend on various factors, such as the air interface protocol used.

GPS receiver 42, also together with one or more antennas (not shown), operates to communicate with the satellite-based global positioning system 18 (i.e., any satellite-based positioning system, whether or not the "GPS" system). Thus, UPS receiver 42 enables the mobile station to obtain information and/or measurements based on satellite-communication to facilitate determining the location of the mobile station. An exemplary GPS receiver is the GPSONE chipset manufactured by Qualcomm Incorporated, but others could be used as well.

User interface 44 preferably facilitates interaction with a user of the mobile station. As such, user interface 44 may include input components, such as a keypad, touch-sensitive screen, scroll wheel, jog dial, voice-input mechanism, and/or various other input components. Further, user interface 44 may include output components, such as a display screen, loudspeaker, headset jack, tactile vibration mechanism, and/or various other output components.

Local connection mechanism 46, in turn, functions to allow the mobile station to communicate with external entities that are not part of the mobile station, and particularly with mapping device 14. As such, local connection mechanism 46 may take various forms, examples of which include those mentioned above (e.g., a USB port, a BLUETOOTH transceiver, etc.)

Processor 48 may comprise one or more general purpose processors (e.g., INTEL processors) and/or one or more special purpose processors (e.g., digital signal processors, application specific integrated circuits, etc.) Data storage 50 may then comprise one or more volatile and/or non-volatile storage components, such as magnetic, optical, or organic storage components, which can be integrated in whole or in part with processor 48.

Data storage 50 preferably contains reference data 54 and program logic 56. The reference data 54 may comprise data such location data points and the location output sequence generated by mobile station 12, among possibly other reference data. And the program logic 56 may comprise program instructions (e.g., machine language instructions) executable by processor 48 to carry out various functions described herein. In particular, exemplary program logic 56 would include at least first, second, and third logic executable by the processor 48 to carry out the functions described above.

The first logic is preferably executable by processor 48 to generate a sequence of location data points (e.g., an NMEA GGA sequence) indicating location of the mobile station over time, and to transmit the sequence via location connection mechanism 46 to mapping device 14 for use by the mapping device to generate and present an active location-map to a user. Further, as discussed above, the sequence would have a dynamic state in which the data points of the sequence vary over time as the mobile station receives varying information from satellites and uses the information to generate the location data points, and the sequence would have a static state in which the data points of the sequence are substantially unchanging over time.

The second logic is then executable by the processor 48 to detect loss of satellite communication and to responsively transition the sequence from the dynamic state to the static state, such that the mapping device would seamlessly continue to receive the sequence, but with the sequence transitioning from the dynamic state to the static state.

The third logic, in turn, is then executable at least while the mobile station is transmitting the sequence in the static state, and the third logic is executable to detect transition of the mobile station into a new cellular wireless coverage area (e.g., based on analysis of cell or sector ID and/or based on received cellular signal strength) and to responsively (i) obtain satellite-assistance data from a cellular radio access network, (ii) use the obtained satellite-assistance data to engage satellite communication, and (iii) transition the sequence from the static state to the dynamic state.

Finally, it should be noted that the exemplary mobile station 12 is preferably distinct from the mapping device 14. That is, the mobile station 12 and mapping device 14 are preferably separate devices, each having a respective device housing and each being able to operate in a basic manner separately from each other. The invention then provides a convenient and efficient manner to establish and provide a location data point sequence to the mapping device, preferably from a mobile station that would need to include a GPS chipset in any event in order to comply with government regulations.

In an alternative embodiment, however, functions of the mobile station 12 and mapping device 14 can be integrated together into a unitary device or can otherwise be combined. Such a combined device or system would still have the mobile station (mobile station function) providing the exemplary location sequence to the mapping device (mapping device function), with the location sequence transitioning between dynamic and static states in the manner described above. For added efficiency, certain duplicate components could be eliminated in the combined embodiment.

An exemplary embodiment of the invention has been described above. It should be understood, however, that various modifications from the embodiment described are possible, while remaining within the true spirit and scope of the invention as defined by the claims.

For instance, although the mapping device has been described above as a device that generates and presents a map to a user, the mapping device could additionally or alternatively serve other mapping related functions based on the location data stream that it receives from the mobile station. For example, the mapping device could be a location logging device, which could log the location data over time, for various uses such as (i) recording the highways traversed by a truck for purposes of paying use-taxes, (ii) auditing routes and advising a user on a better route than the one taken, (iii) detecting travel outside of an expected range or route, (iv) ensuring truck driver compliance with rest periods required by governmental regulations, by evaluating the location data to ensure that the data indicates sufficient periods of no change in location. Other variations from the embodiment described above are possible as well.

We claim:

1. A method operable by a mobile station, the method comprising:

generating a sequence of location data points indicating location of the mobile station over time, and transmitting the sequence to a mapping device, wherein the sequence has a dynamic state in which the data points of the sequence vary over time as the mobile station receives varying information from satellites and uses the information to generate the location data points, and the sequence has a static state in which the data points of the sequence are substantially unchanging over time;

detecting a loss of satellite communication, and responsively transitioning the sequence from the dynamic state to the static state, wherein transitioning the sequence from the dynamic state to the static state comprises transitioning to have the location data points of the sequence be a substantially constant repetition of each other, whereby the sequence in the static state received by the mapping device thereby indicates substantially no change in position of the mobile station over time; and while transmitting the sequence in the static state, detecting transition of the mobile station in cellular network service, and responsively (i) obtaining satellite-assistance data from a cellular radio access network, (ii) using the obtained satellite-assistance data to engage in satellite communication, and (iii) transitioning the sequence from the static state to the dynamic state.

2. The method of claim 1, wherein the mapping device is operable to generate and present an active location-map to a user, and wherein transmitting the sequence to the mapping device comprises transmitting the sequence to the mapping device for use by the mapping device to generate the active location-map.

3. The method of claim 1, wherein the mapping device is operable to log location over time, and wherein transmitting the sequence to the mapping device comprises transmitting the sequence to the mapping device for use by the mapping device to log location.

4. The method of claim 1, further comprising beginning transmission of the sequence in the static state before transmitting the sequence in the dynamic state.

5. The method of claim 4, wherein beginning transmission of the sequence in the static state comprises beginning transmission of the sequence when the mobile station is indoors and lacks sufficient satellite communication to generate the sequence in the dynamic state.

6. The method of claim 1, further comprising detecting restoration of satellite communication, and responsively transitioning the sequence from the static state to the dynamic state.

7. The method of claim 1, wherein detecting transition of the mobile station in cellular network service comprises detecting transition of the mobile station from being served by a first cellular wireless coverage area to being served by a second cellular wireless coverage area, wherein each cellular wireless coverage area is an area selected from the group consisting of a cell and a cell sector.

8. The method of claim 7, wherein detecting transition of the mobile station from being served by the first cellular wireless coverage area to being served by the second cellular wireless coverage area comprises concluding that the mobile station is served by the second wireless coverage area only after a predefined threshold time period of the mobile station being served by the second wireless coverage area.

9. The method of claim 1, wherein detecting transition of the mobile station in cellular network service comprises detecting a threshold change in pilot signal strength from the cellular radio access network.

10. The method of claim 1, wherein obtaining satellite-assistance data from the cellular radio access network comprises requesting the satellite-assistance data and receiving the satellite-assistance data in response.

11. The method of claim 1, wherein the satellite-assistance data comprises data enabling the mobile station to tune to communications with the satellites, and wherein using the obtained satellite-assistance data to engage in satellite communication comprises tuning to communications with the satellites and receiving communications from the satellites.

12. The method of claim 1, wherein the cellular mobile station comprises a cellular telephone.

13. The method of claim 1, wherein the mapping device comprises a personal computer.

14. The method of claim 13, wherein the cellular mobile station comprises a PC card connectable to the personal computer.

15. The method of claim 1, where the sequence of location data points comprises a National Maritime Equipment Association (NMEA) GGA sequence.

16. The method of claim 1, wherein transitioning to have the location data points of the sequence be a substantially constant repetition of each other comprises transitioning to have the location data points of the sequence be a substantially constant repetition of a location data point generated by the mobile station when the sequence was in the dynamic state.

17. The method of claim 16, wherein the location data point of which the location data points of the sequence are a substantially constant repetition is a location data point determined by requesting location of the mobile station from a cellular network based location-determination system.

18. The method of claim 17, wherein the location data point determined by requesting location from the cellular network based location-determination system is determined using advanced forward link trilateration.

19. The method of claim 16, wherein the location data point generated by the mobile station when the sequence was in the dynamic state is a last location data point generated by the mobile station before transitioning the sequence from the dynamic state to the static state.

20. A cellular mobile station comprising:

a cellular wireless transceiver for communicating with a cellular radio access network;

a processor;

data storage;

first logic stored in the data storage and executable by the processor to generate a sequence of location data points indicating location of the mobile station over time, and to transmit the sequence to a mapping device for use by the mapping device to generate and present an active location-map to a user, wherein the sequence has a dynamic state in which the data points of the sequence vary over time as the mobile station receives varying information from satellites and uses the information to generate the location data points, and the sequence has a static state in which the data points of the sequence are substantially unchanging over time;

second logic stored in the data storage and executable by the processor to detect loss of satellite communication and to responsively transition the sequence from the dynamic state to the static state, wherein transitioning the sequence from the dynamic state to the static state comprises transitioning to have the location data points of the sequence be a substantially constant repetition of each other, whereby the sequence in the static state received by the mapping device thereby indicates substantially no change in position of the mobile station over time;

third logic stored in the data storage and executable by the processor, while the mobile station is transmitting the sequence in the static state, to detect transition of the mobile station into a new cellular wireless coverage area and to responsively (i) obtain satellite-assistance data from a cellular radio access network, (ii) use the obtained satellite-assistance data to engage in satellite communication, and (iii) transition the sequence from the static state to the dynamic state.

21. The cellular mobile station of claim 20, wherein the sequence of location data points comprises a National Maritime Equipment Association (NMEA) GGA sequence.

22. The cellular mobile station of claim 20, wherein the mapping device comprises a personal computer.

23. The cellular mobile station of claim 20, wherein transitioning to have the location data points of the sequence be a substantially constant repetition of each other comprises transitioning to have the location data points of the sequence be a substantially constant repetition of a location data point generated by the mobile station when the sequence was in the dynamic state.

24. The cellular mobile station of claim 23, wherein the location data point of which the location data points of the sequence are a substantially constant repetition is a location data point determined by requesting location of the mobile station from a cellular network based location-determination system.

25. The cellular mobile station of claim 24, wherein the location data point determined by requesting location from the cellular network based location-determination system is determined using advanced forward link trilateration.

26. The cellular mobile station of claim 23, wherein the location data point generated by the mobile station when the sequence was in the dynamic state is a last location data point generated by the mobile station before transitioning the sequence from the dynamic state to the static state.

* * * * *